United States Patent [19]

Herczeg et al.

[11] Patent Number: 5,371,524
[45] Date of Patent: Dec. 6, 1994

[54] END PULSE WIDTH MODULATION FOR DIGITAL IMAGE PRINTER WITH HALFTONE GRAY SCALE CAPABILITY

[75] Inventors: Karen L. Herczeg; David M. McVay, both of Rochester, N.Y.

[73] Assignee: Eastman Kodak Company, Rochester, N.Y.

[21] Appl. No.: 797,634

[22] Filed: Nov. 25, 1991

[51] Int. Cl.[5] .............................................. B41J 2/435
[52] U.S. Cl. ................................... 346/107 R; 358/298
[58] Field of Search ................... 346/107 R, 108, 154, 346/150; 358/298

[56] References Cited

U.S. PATENT DOCUMENTS

| | | | |
|---|---|---|---|
| 4,415,913 | 11/1983 | Diddens | 346/154 |
| 4,626,923 | 12/1986 | Yoshida | 358/298 X |
| 4,661,861 | 4/1987 | Rutherford et al. | 358/302 |
| 4,679,057 | 7/1987 | Hamada | 346/76 L |
| 4,754,291 | 6/1988 | Horikawa | 346/108 |
| 4,807,047 | 2/1989 | Sato et al. | 346/107 R X |
| 4,965,672 | 10/1990 | Duke et al. | 358/298 |
| 5,025,322 | 6/1991 | Ng | 358/298 |

OTHER PUBLICATIONS

J. P. Mantey and L. E. Rittenhouse, "Cascadeable Linear LED Array Module", *IBM Technical Disclosure Bulletin*, vol. 24, No. 10, Mar. 1982, pp. 5034–5037.

*Primary Examiner*—Benjamin R. Fuller
*Assistant Examiner*—David Yockey
*Attorney, Agent, or Firm*—Norman Rushefsky

[57] ABSTRACT

A gray scale printer modulates an exposure source in both amplitude and duration such that the exposure source is actuated during the latest portion of each pulse time period. For exposure periods having actuation times that are very short relative to the decay period of the amplitude-modulating electronics, actuation time of the exposure source for very short exposure periods may be timed to end before the start of the decay period. If the amplitude modulating means includes electronics having a ramping up period before producing a stable output, the actuation of the exposure source occurs during each pulse time period only after the ramping up period has substantially expired.

8 Claims, 4 Drawing Sheets

END PULSE WIDTH MODULATION FOR DIGITAL IMAGE PRINTER WITH HALFTONE GRAY SCALE CAPABILITY

CROSS-REFERENCE TO RELATED APPLICATION

Reference is made to our commonly assigned, co-pending U.S. patent application Ser. No. 07/787,284, entitled HYBRID DIGITAL IMAGE PRINTER WITH HALFTONE GRAY SCALE CAPABILITY, filed on Nov. 4, 1991.

BACKGROUND OF THE INVENTION

1. Technical Field

This invention relates generally to gray scale printers, and more particularly to a printer in which gray scale is reproduced by modulating the amplitude and duration of a spot exposure source.

2. Background Art

In digital recording apparatus, a record medium is raster-wise exposed with a point light source or sources, such as a scanning laser beam or an array of light-emitting diodes, to form visual or latent images on the record medium. The record medium may, for example, be a photoconductive member on which an electrostatic image is formed by selective exposure to light. The electrostatic image is developable by, say, the electrographic process.

Tone scale image quality depends on both the system tone reproduction curve, which defines a gray scale transformation from the digital image data to the printed image, and on the number of levels of gray the system is capable of reproducing. Halftone imagery is an approximation by the printing apparatus to produce the continuum of gray scale by varying the exposure intensity and/or the printed dot sizes prearranged in a geometric pattern. Variations yield a varying percent of light reflection from the printed image thereby creating the apparent gray scale illusion.

Various proposals have been made for reproducing tones with the use of such apparatus, including modulating the exposure duration and/or the exposure amplitude of the light source. See for example U.S. Pat. No. 4,679,057, which issued to A. Hamada on Jul. 7, 1987. Modulation of the exposure duration is commonly referred to as "pulse width modulation."

In pure pulse width modulation, the current supplied to an exposure source, such as light-emitting diodes or a laser diode, is constant. Gray scale is effected by modulating the "on" time of the light source. Pulse width modulation is used in most commercially available black-only gray scale printers, wherein different pulse widths are required for the different gray levels.

In early apparatus using pulse width modulation, pulses occurred at the start of each allotted pixel time, and lasted for respective time periods to effect the desired gray level, as shown in FIG. 1. In some improved apparatus, pulses are delayed an appropriate period so that the pulses are centered in the pixel time, as shown in FIG. 2.

In a known hybrid laser modulation approach, a scanning laser beam or an array of light-emitting diodes are controlled through combined pulse width modulation and amplitude modulation. Hybrid modulation, as illustrated in FIG. 3, is described in our commonly assigned, copending U.S. patent application Ser. No. 07/787,284, entitled HYBRID DIGITAL IMAGE PRINTER WITH HALFTONE GRAY SCALE CAPABILITY, filed Nov. 4, 1991.

The amplitude modulation aspect of such hybrid printers includes an electronics package generally including an analog-to-digital converter, which requires a finite time period to stabilize. In FIG. 3, such a time period has been provided before the longest pulse begins. Because the pulse is centered, there is also provided a time period at the trailing end of the longest pulse, equal to the time period at the beginning of the longest pulse. This results in an undesirably enlarged pixel time requirement. Even though very fast electronic components, including analog-to-digital converters, are known, fast electronics are very expensive when compared to slower electronics for the same function.

Accordingly, it is an object of the present invention to provide a pulse width modulation scheme in which the slowest, and thereby lowest price, electronic components can be used for a given pixel time.

DISCLOSURE OF INVENTION

A gray scale printer according to one aspect of the present invention modulates an exposure source in both amplitude and duration such that the exposure source is actuated during the latest portion of each pulse time period.

Signals that pass through a number of logic gates before being outputted are delayed by the propagation delays of the gates. If the exposure period actuation time is very short relative to the propagation delay, a substantial portion of the actuation time will extend into the next pixel time. According to a feature of the present invention, the actuation time of the exposure source for these very short exposure periods is timed to end before the start of the next pixel time.

According to another aspect of the present invention, if the amplitude modulating means includes electronics having a ramping up period before producing a stable output, the actuation of the exposure source occurs during each pulse time period only after the ramping up period has substantially expired.

According to yet another aspect of the present invention, a gray scale printer pulse width modulates an exposure source such that the exposure source is actuated during the latest portion of each pulse time period.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Figure 1:
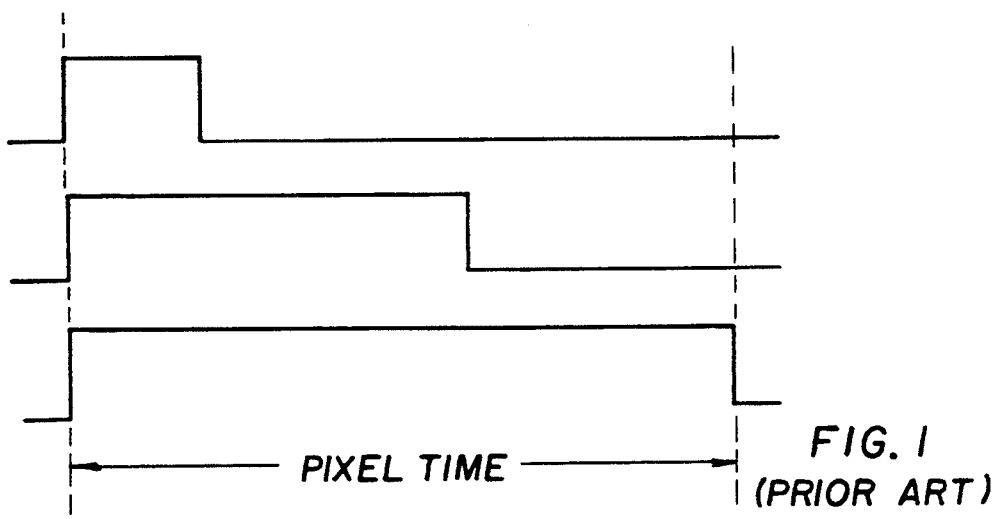
FIGS. 1 and 2 are illustrations of the pixel time for various gray scales using pulse width modulation according to the prior art.
Figure 2:
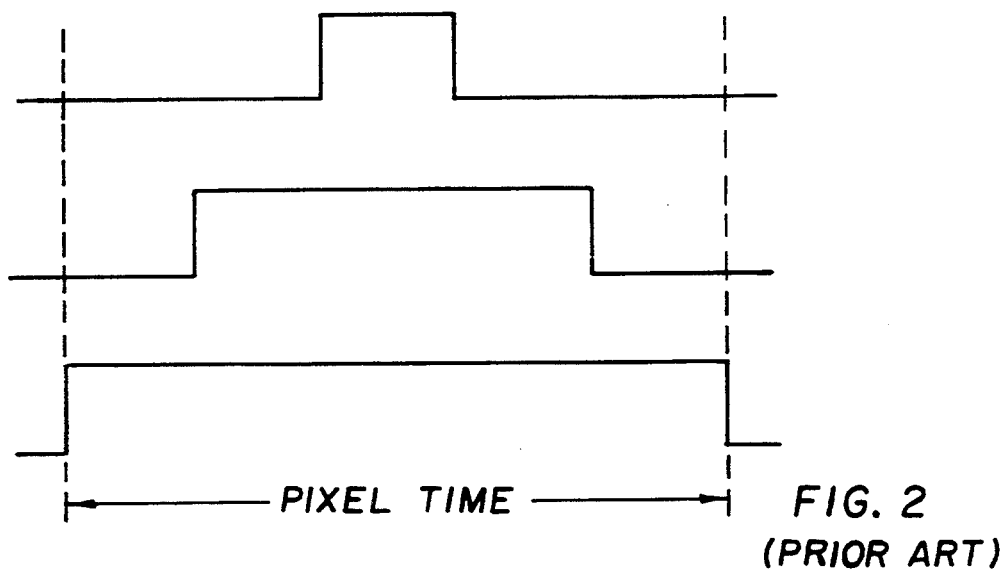
Figure 3:
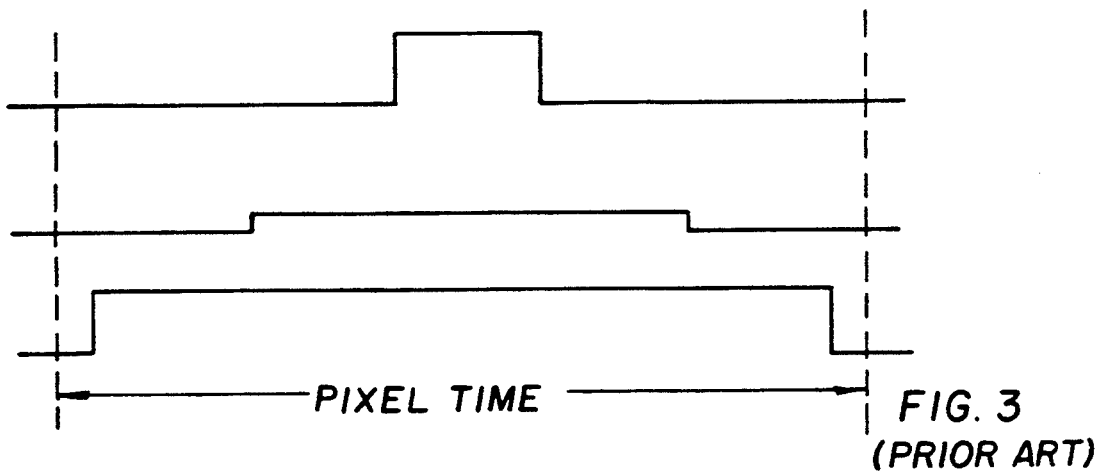
FIG. 3 is an illustration of the pixel time and pixel illumination for various gray scales using hybrid modulation according to the prior art.

In this specification, the invention will be described in a laser printer that uses a hybrid laser modulation approach, wherein a scanning laser beam or an array of light-emitting diodes are controlled through combined pulse width modulation and amplitude modulation, as illustrated in FIG. 3. Hybrid modulation is described in our above-mentioned copending U.S. patent application Ser. No. 07/787,284.

It will be understood that, while the present invention is described in the environment of a hybrid printer, many aspects of the invention are applicable to strictly pulse width modulation printers. Other aspects do relate closely to printers combining pulse width and amplitude modulation.

Hybrid modulation can be implemented using as many combinations of pulse widths and amplitude levels as the system will support. In the illustrative example of this specification, hybrid modulation is implemented in an eight-bit system using two bits for pulse width modulation and six bits for amplitude modulation.

Figure 4:
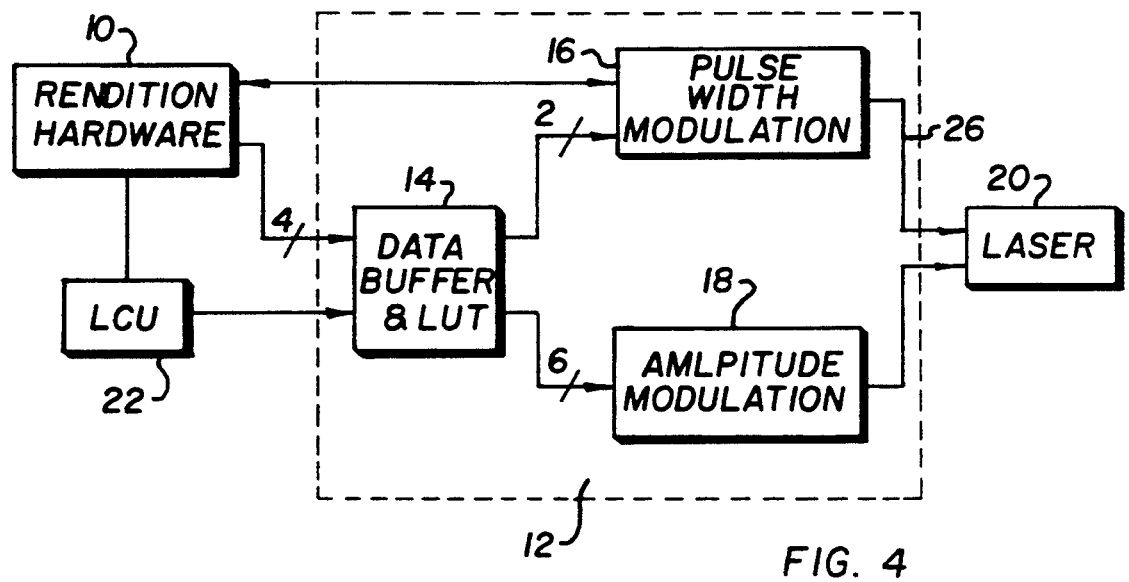
FIG. 4 is a schematic block diagram of a gray scale printer in accordance with a preferred embodiment of the present invention.

A block diagram of the hybrid modulator designed for the printer is shown in FIG. 4. This diagram shows rendition hardware 10 input to a laser modulator 12. Major components of the laser modulator include a data buffer and look-up table 14, a pulse width modulation block 16, and an amplitude modulation block 18. Laser modulator 12 produces a pulse width signal and an amplitude signal to a laser 20.

The rendition hardware 10 provides the pixel exposure data to laser modulator 12. This data is a four-bit value (zero to fifteen) received either in bytes (2 pixels from a full framestore or in nibbles (1 pixel) from a compressed page buffer.

A logic and control unit 22 provides signal conditioning of machine timing signals for laser modulator 12 and rendition hardware 10. The signals from the logic and control unit are a start-of-page signal and an "engine up to speed" signal. The start-of-page signals are counted and used to generate color separation signals to be used by data buffer and look-up table 14 to select separation-dependent look-up tables used for color correction.

Figure 5:
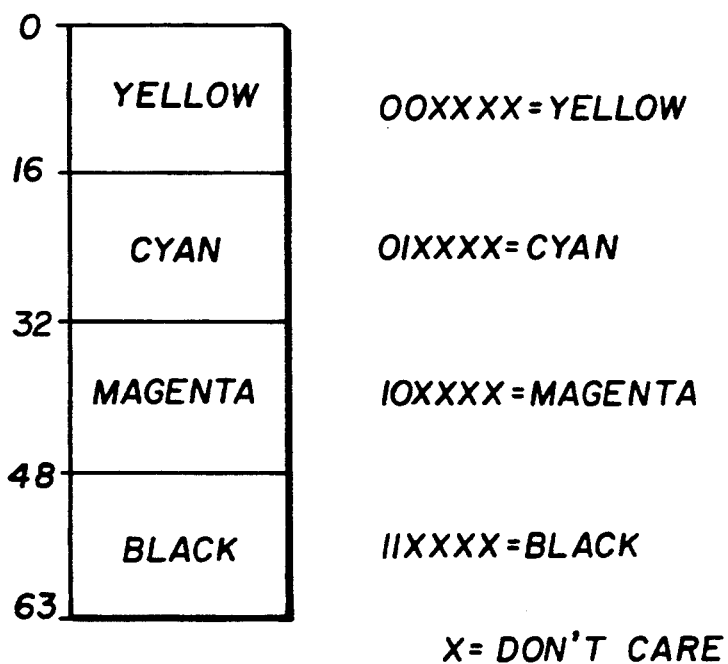
FIG. 5 is a diagram of the organization of a look-up table according to a feature of the present invention.

A separate look-up table is required for each color separation as depicted in FIG. 5. The individual color toners may not have the same tone reproduction characteristics, and different amounts of each toner would therefore be required to obtain a given density.

Operation of the data buffer and look-up table 14 is fully described in the above-mentioned, co-pending U.S. patent application, the disclosure of which is hereby specifically incorporated hereinto by reference. The eight-bit exposure value from the look-up table is divided into a two-bit data signal to do pulse width modulation and a six-bit data signal to do amplitude modulation. The six less-significant bits of the exposure value are used in the amplitude modulation section of the driver. The two more-significant bits of the exposure value are used to designate the pixel's pulse width.

Figure 6:
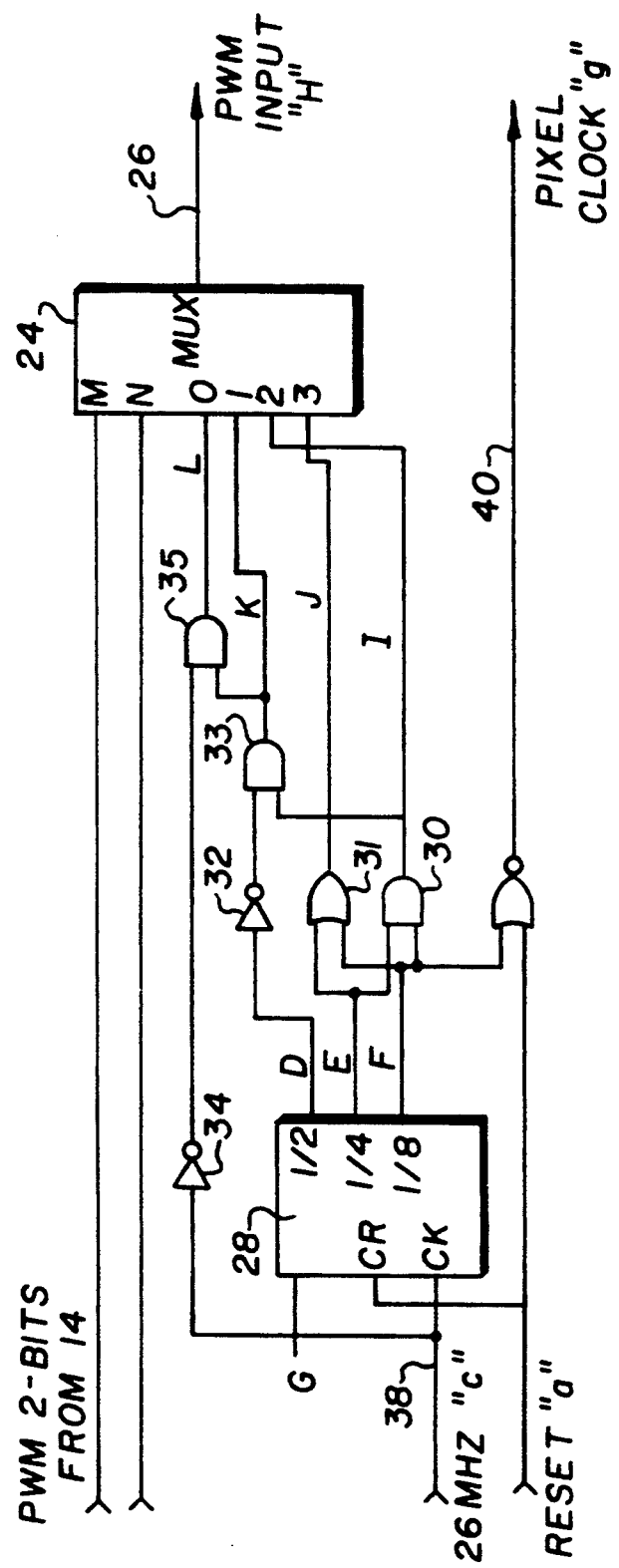
FIG. 6 is a detailed view of a portion of the schematic block diagram of FIG. 4.

Pulse width modulation block 16 is shown in greater detail in FIG. 6. The two more-significant bits from look-up table 14 are fed to connections "M" and "N" of a multiplexer 24 to select one of connections 0, 1, 2, or 3 as the pulse width data to be output over a connection 26 to laser 20.

Figure 7:
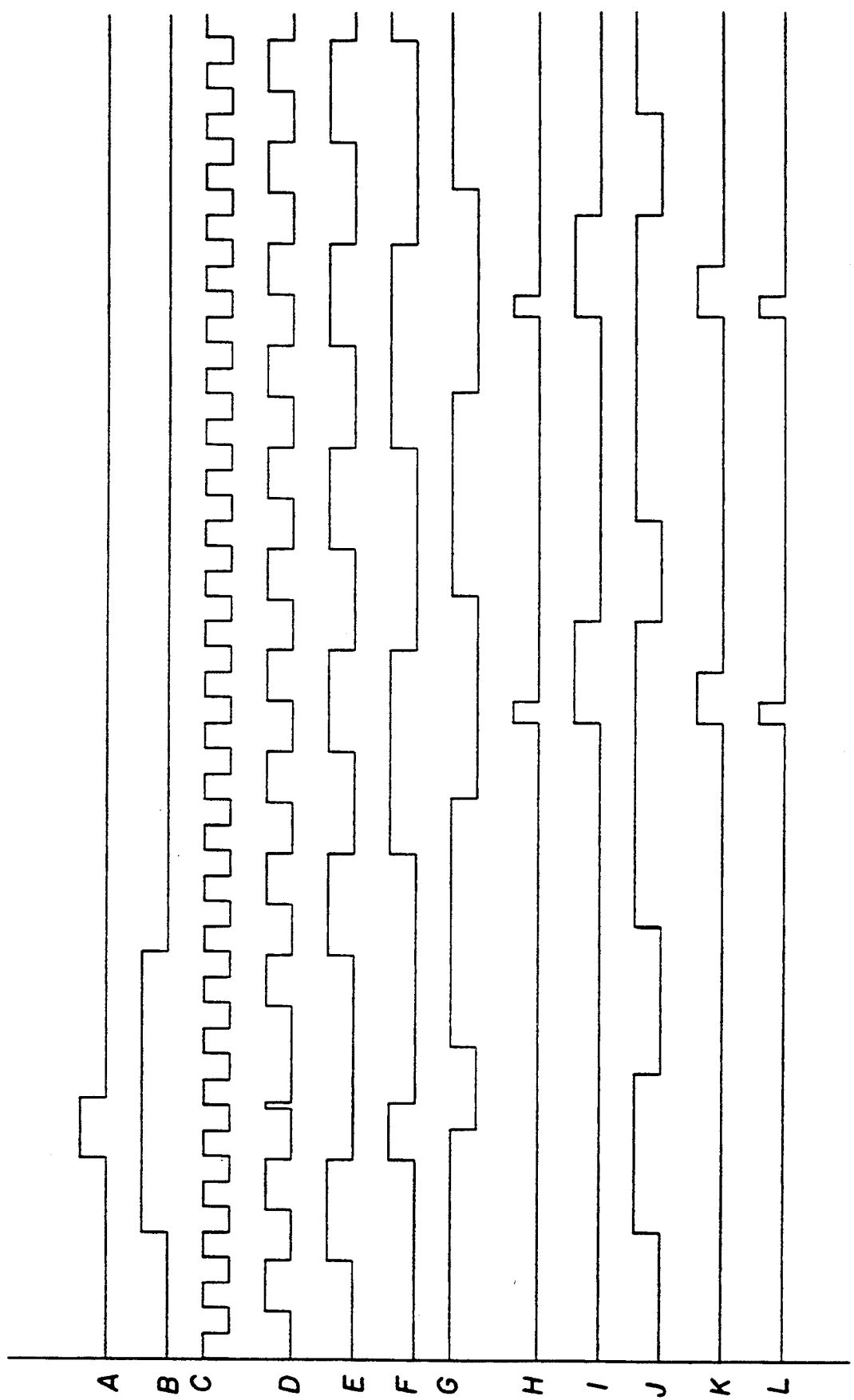
FIG. 7 is a timing diagram for the gray scale printer of FIG. 4.

The inputs to connections 0, 1, 2, and 3 of multiplexer 24 are derived from a frequency divider 28 and a series of logic components 30–35 as explained with respect to FIGS. 6 and 7. Frequency divider 28 is reset by a signal "A" (FIG. 7), which is, in turn, synchronized with start-of-scan signal "B" derived from laser scanner 20.

Frequency divider 28 receives a 26.6 MHz clock signal ("C" in FIG. 7) on line 38 from an oscillator, not shown, conveniently housed as a part of pulse width modulation block 16. The frequency divider outputs three signals ("D", "E", and "F" in FIG. 7) which are the 26.6 MHz clock signal divided by two, four, and eight, respectively.

The clock signal is eight times the pixel rate. Accordingly, a pixel clock signal 40 can be obtained directly from frequency divider output "F" logic NOR'ed with reset signal "A", as shown at "G" and "H" (the "data out" signal).

Four arbitrary choices of pulse widths might for example correspond to 75%, 25%, 12.5% and 6.25% of a pixel time in the illustrative example. A 25% of the pixel time signal is obtained by logic AND'ing the "E" and "F" outputs of frequency divider 28, as shown at 30, to produce signal "I" at input 2 of multiplexer 24. A 75% of the pixel time signal is obtained by logic OR'ing the "E" and "F" outputs of frequency divider 28, as shown at 31 to produce signal "J" at input 3 to multiplexer 24.

A 12.5% of the pixel time signal is obtained by logic AND'ing the inverted "D" output of frequency divider 28 with the "I" signal to input 2 of the multiplexer, as shown at 33 to produce signal "K" at input 1 of multiplexer 24.

Signals that pass through logic gates are delayed by the propagation delays of the gates. If the exposure period actuation time (the pulse width) is short relative to the total propagation delay, a substantial portion of the pulse width will extend into the next pixel time. Therefore, the present invention provides a way to time actuation of the exposure source for these very short exposure periods so as to end before the start of the next pixel time.

By inverting the "D" output of frequency divider 28 before applying it to logic AND gate 33, the output of the logic AND gate is shifted $\frac{1}{8}$ of the pixel time earlier to avoid having the actuation time extend into the next pixel time.

Forward shifting the pixel time is important where the pulse width is short, such as in a 12.5% pulse width, but would not be significant for the above-mentioned 75% and 25% pulse widths; which is the reason those outputs are not shifted.

A 6.25% of the pixel time signal is obtained by logic AND'ing the inverted clock signal "C" with the "K" signal to input 1 of the multiplexer, as shown at 35 to produce signal "L" at input 0 to multiplexer 24. By inverting clock signal "C" before applying it to logic AND gate 35, the output of the logic AND gate is shifted 1/16 of the pixel time earlier to avoid extending a portion of the pulse width into the next pixel time.

The reader will note that each pulse time signal "I", "J", "K", and "L" is shifted to the end of the pixel time period; or substantially to the end in the cases of signals "K" and "L". By so doing, a significantly longer period of time is provided from the start of each pixel time period "H" before laser 20 must begin writing. This is an important advantage of the present invention because it provides the maximum time available for a given pixel time period and a given pulse width; thereby allowing the analog-to-digital converter in amplitude modulator 18 to settle before the data is used.

Of course, faster analog-to-digital converters might be usable so that the pulses can occur earlier in the pixel period, as would need to be the case if the pulses were centered; but faster electronics are expensive relative to slower electronics, and economy is always a factor.

The invention has been described in detail with particular reference to preferred embodiments thereof, but it will be understood that variations and modifications can be effected within the spirit and scope of the invention.

What is claimed is:

1. A gray scale printer for recording pixels by activating an exposure source to emit exposure radiation and modulating the exposure radiation in both intensity and duration in accordance with a received gray scale data signal for recording a pixel, said printer comprising:
   means for defining a series of pulse time periods during which the exposure source is activated for emitting radiation during determinable durations at determinable intensities for recording respective pixels;
   intensity modulating means for modulating the intensity of the exposure radiation during one of said pulse time periods in accordance with the data signal for recording one of said pixels; and
   duration modulation means for modulating the duration of the exposure radiation in accordance with said data signal, said duration modulating means generating pulses of different pulse width durations to define a longer duration exposure control pulse and a shorter duration exposure control pulse that is substantially shorter in duration than the longer duration pulse and said shorter duration pulse controlling duration of activation of radiation to record said one pixel so as to occur only during a latter half portion of said one of said pulse time periods to allow said intensity modulating means to stabilize during an initial portion of said one of said pulse time periods when recording said one pixel with a shorter duration exposure and said shorter duration pulse terminating at a time prior to termination of said longer duration exposure control pulse.

2. The gray scale printer of claim 1 wherein:
   said duration modulating means includes electronics having an accumulated propagation delay;
   during some pulse time periods the exposure source is activated for a time that is very short relative to the propagation delay; and
   said duration modulating means includes means for controlling activation of the exposure source, for very short exposure periods, to end before a start of a next pulse time period.

3. The gray scale printer of claim 1 wherein:
   said intensity modulating means includes electronics having a ramping up period before producing a stable output; and
   said duration modulating means includes means for controlling activation of the exposure source to occur during each of said pulse time periods after said ramping up period has substantially expired.

4. The gray scale printer of claim 3 wherein said duration modulating means effects a pulse width of electrical current to the exposure source.

5. The gray scale printer of claim 3 wherein said exposure source is a laser diode.

6. The gray scale printer of claim 3 wherein said exposure source is a light-emitting diode array.

7. The gray scale printer of claim 1 wherein:
   said intensity modulating means includes electronics having a decay period at an end of each of said pulse time periods;
   during some of the pulse time periods the exposure source is activated for a time that is very short relative to the decay period; and
   said duration modulating means includes means for controlling activation of the exposure source, for very short exposure periods, to end before the start of said decay period.

8. The printer of claim 1 and wherein said duration modulation means includes:
   means for generating a series of master clock pulse signals at a first frequency;
   frequency divider means for generating, in response to said clock pulse signals, plural first signals of different frequencies from that of said clock pulse signals, a frequency of each of the first signals being a fraction of the master clock frequency; and
   logic means for logically combining the plural first signals of different frequencies to generate said shorter duration exposure control pulse.

* * * * *